United States Patent Office 3,454,510
Patented July 8, 1969

3,454,510
POLYOLEFIN COMPOSITIONS AND DEGRADABLE
FILMS MADE THEREFROM
Gordon C. Newland, George R. Greear, and John W.
Tamblyn, Kingsport, Tenn., assignors to Eastman Kodak Company, Rochester, N.Y., a corporation of New Jersey
No Drawing. Filed Mar. 3, 1966, Ser. No. 531,368
Int. Cl. C08f 29/02; A01g 7/00, 1/00
U.S. Cl. 260—23                                    10 Claims

ABSTRACT OF THE DISCLOSURE

Polyolefin compositions containing a pro-oxidant and an opaquing agent which are suitable for forming into agricultural mulching films.

---

This invention relates to agricultural films which have a controlled rate of deterioration and further concerns the preparation of these films.

The desire to improve horticultural techniques has in recent times fostered the use of opaque plastic film such as black polyethylene for covering the soil between plants, thereby preventing photosynthesis and the growth of weeds. Films heretofore employed, however, have not provided the answer to the weed problem in large scale farming since they must eventually be removed from the fields. This of course involves considerable non-profitable labor.

Objects, therefore, of the invention are: to advance the state of the horticultural art by providing plastic film which can be laid on soil to suppress weed growth and which will become sufficiently friable to be plowed under at the end of a growing season; and to further provide by way of said film a practical and inexpensive means to condition the soil and/or ambient atmosphere to further aid in proper growth of plants.

These and other objects which will become apparent through the following disclosure have been achieved through the discovery that plastic films, particularly of polyolefins and especially polyethylene and blends thereof with other polyolefins can be so chemically constituted that at the end of a required period they are sufficiently friable to be easily and effectively plowed into the ground. Moreover, an innumerable variety of what may be termed third components such as plant foods, fertilizers, insect repellents, insecticides, fungicides, animal repellents, bactericides, soil conditioners and the like in a wide range of concentrations may be incorporated into these plastic films to perform desired functions. Particularly important and useful herein are the nitrogen releasing fertilizers such as ammonium and potassium nitrates which may be used in amounts giving up to about 20% by weight of available nitrogen. In general, the amount of such third components which may be employed will be limited by decrease in tensile properties of the initial films. A total concentration of up to about 35% by weight is useful herein.

More specifically, it has been discovered that plastic film may be made suitable for the aforesaid agricultural purposes by incorporating therein one or more oxidation catalysts (pro-oxidants) in amounts especially prescribed for the growing period of a particular crop. Any of a large variety of pro-oxidants may be employed within the scope of the present invention, the major requirement thereof being that it promote oxidative deterioration of the film at a controllable rate.

Such pro-oxidants include: manganous stearate, manganous oleate, manganous acetate, manganous dodecyl acetoacetate, cobalt acetyl acetonate, cobaltous acetate, cobaltous naphthalenate, cobalt acetyl acetonate, cobaltous oleate, cobaltous stearate, cobaltous dodecyl acetoacetate, cupric stearate, cupric oleate, and ferric acetate. Although the above are preferred, in general, a large variety of known pro-oxidants which substantially increase the rate of photo-oxidation may be employed in accordance with the present invention. The representative illustrations given herein show that useful pro-oxidants include the acetylacetonates of manganese, cobalt, chromium, copper and vanadium, the alkyl acetoacetates (8 to 18 carbons in the alkyl group) and alkyl (8 to 18 carbons) benzoylacetates of copper, vanadium, chromium, manganese, cobalt, iron, nickel and zinc. It is noted that the rates of degradation, of course, will vary and the proper concentration of these various pro-oxidants may be adjusted by one skilled in the art to give the proper deterioration rate.

As aforesaid, the amount of pro-oxidant employed will depend on its activity; however, total amounts of one, or mixtures of two or more of the pro-oxidants equalling from about 0.01 to about 1.5% by weight based on the polyolefin weight find utility in the present invention. Where the most preferred manganous and cobaltous stearates and oleates are employed either alone or admixed, the total concentration is preferably in the range of from about 0.01 to about 0.5%, and most desirably from about 0.01 to about 0.1% by weight based on the polyolefin weight. This most desirable concentration range has been found by a series of tests employing polyethylene film containing 2% Sterling R and from 0.05 to 0.2% of these pro-oxidants to give the proper degradation of the mulching film after exposure, of from about 12 to about 3 weeks respectively, to outdoor weathering conditions with the film actually lying on the ground. When used in admixture, each pro-oxidant concentration may range from approximately 0 to about 100% of the mixture and may be blended either separately or as a mixture into the polyolefin. These pro-oxidants in powdered form blend very readily by, for example, rolling or milling into the polyolefin and are seen to become essentially completely and homogeneously dispersed therein.

In order to render the film opaque to substantially all or selective light wavelengths, various pigments or dyes may be incorporated into the plastic either during polymerization or thereafter by suitable blending techniques such as banburying well known to the plastics-coloring art. Carbon black pigment, preferably of the coarser particle-size varieties such as Sterling R, having average particle diameters of 30 m$\mu$, and 4-[P-bis(2-hydroxyethyl)-aminophenylazo - p - phenyleneazo] - 3 - hydroxy - 2-naphthoic acid black dye, have been found particularly well suited to the invention.

The term "opaque" as used herein means that preferably less than about three percent ordinary sunlight is transmitted through the polyolefin film; more specifically, the film in the preferred embodiment has an optical density greater than 1.5 to visible light and to ultraviolet down to 300 m$\mu$ wavelength. For certain applications less complete opacities are useful, for example, transmission of 10% or more. For many applications, a transmittance of less than 1% is required. As a guide to establishing the amount of carbon black required to give the preferred opacity, the finer particle size carbon blacks and the like give greater opacities. Generally particle sizes of from about 10 m$\mu$ to about 300 m$\mu$ are useful. Where the particle size is from about 30 to about 100 m$\mu$ average diameter, from about 0.35 to about 3% by weight of the carbon black based on the polyolefin weight has been found satisfactory. Where the particle size is from about 10 to about 30 m$\mu$ average diameter, about 0.2 to about 1% of the carbon black is effective. In general it has been found that above about 10% by weight of even the coarser carbon blacks gives an initial undegraded film of undesirably low toughness, and this percentage therefore represents the upper limit for most applications. Higher percentages, for example 15% or more of opaquing agent, may be employed where initial toughness and tensile properties of the film are not dominant considerations. Where the black organic dye 4-[P-bis(2-hydroxyethyl)aminophenylazo - p - phenyleneazo] - 3-hydroxy-2-naphthoic acid is used, concentrations of from about 0.05 to about 1.0% by weight are preferred.

The thickness of any particular film will of course be a factor in regulating its rate of deterioration. For most agricultural purposes a film of about 3 mils thickness is satisfactory from the standpoints of initial strength and adjustability of deterioration rate.

In determining the effect of various additives (pro-oxidants, fertilizers, etc.) on the deterioration rate, polyethylene (Tenite 860) of melt index 1.7 (ASTM, D1238–52T) and density 0.918 was roll-compounded for 5 minutes with the additives to be incorporated. The roll temperature of the front roll was 270° F. and that of the rear roll was 220° F. The resulting compositions were compression-molded to films 3 mils thick which were then exposed for various lengths of time in an Atlas Twin-Arc Weather-Ometer, modified by the addition of ten Westinghouse 20-watt fluorescent sun lamps (Anal. Chem. 25 460, 1953). Evaluation of weathering damage was made by: (a) Measurement of percent elongation to break (Instron Tensile Tester at clamp separation rate of 2000% per minute); (b) Measurement of embrittlement time. The onset of brittleness in the film was determined by creasing and was defined to have developed when the film broke on a single crease.

The following specific examples will further illustrate the invention.

EXAMPLES 1–9

Two percent of a carbon black having an average particle size of about 65 m$\mu$ diam. (Sterling R) was compounded into conventional low-density polyethylene (Tenite 860). Films 3-mils thick of this composition and compositions containing other coarse carbon blacks were exposed in the Weather-Ometer described above. Similar films containing, in addition to the carbon black, either 1% of cobalt acetate or 1% of copper oleate, or 1% of manganous stearate were also prepared and exposed. A control film containing no additives was included for comparison. Table 1 shows the weathering resistance of these films. It is obvious that the addition of the cobalt, copper, and manganese pro-oxidants markedly accelerated the rate of breakdown. Since 500 hours' exposure in the Weather-Ometer is about equivalent to a year's exposure outdoors, the photosensitized black films fulfill the requirement that they become embrittled by outdoor exposure for one growing season. Embrittlement as used herein is determined by a single creasing of the film, exposed side out, which results in breaking of the film. It is noted that conventional black 3-mil-thick polyethylene film containing 2% of a carbon black having an average particle size of about 20 m$\mu$ diam. (e.g., Monarch 71), required 1500 hours' exposure to produce embrittlement.

TABLE 1

| Ex. | Film composition | Elongation after 188 hr. exposure | Break on one crease with weathered side out— exposure time (hr.) required for embrittlement |
| --- | --- | --- | --- |
| 1 | Tenite 860 | 25 | 400 |
| 2 | Tenite 860+2% Sterling R | 15 | 260 |
| 3 | Tenite 860+2% Sterling R+1% cobalt acetate. | 0 | 180 |
| 3A | Tenite 860+2% Sterling R+1% cobalt acetyl acetonate. | 0 | 180 |
| 4 | Tenite 860+2% Sterling R+1% copper oleate. | 0 | 180 |

TABLE 1—Continued

| Ex. | Film composition | Elongation after 188 hr. exposure | Break on one crease with weathered side out— exposure time (hr.) required for embrittlement |
| --- | --- | --- | --- |
| 5 | Tenite 860+2% Sterling R+1% manganous stearate. | 0 | 225 |
| 5A | Tenite 860+2% Sterling R+1% manganous dodecyl acetoacetate. | 0 | 180 |
| 6 | Tenite 860+0.5% lamp black | 26 | 260 |
| 7 | Tenite 860+0.5% lamp black+1% cobalt acetate. | 0 | 180 |
| 7A | Tenite 860+0.5% lamp black+1% cobalt acetyl acetonate. | 0 | 180 |
| 8 | Tenite 860+0.5% bone black | 25 | 400 |
| 9 | Tenite 860+0.5% bone black+1% cobalt acetate. | 0 | 180 |
| 9A | Tenite 860+0.5% bone black +1% cobalt acetyl acetonate. | 0 | 180 |

The manganous dodecyl acetoacetate may be prepared by dissolving 12 g. (0.05 mole) of manganous acetate tetrahydrate in 25 ml. of water and diluting with 250 ml. of ethanol. With stirring is added to the solution 27 g. (0.10 mole) of dodecyl acetoacetate followed by the addition of 4.0 g. (0.10 mole) of sodium hydroxide in 25 ml. of 50% aqueous ethanol. The mixture is chilled and filtered and the cake washed with water and ethanol, and then dried. The product, 27 g., is obtained as pale tan crystals melting at 100–105° C.

*Analysis.*—Calc'd for $C_{32}H_{58}O_6Mn$: Mn, 9.25%. Found: Mn, 9.68%.

The cobaltous dodecyl acetoacetate may be prepared by following the above procedure but using 12.5 g. (0.05 mole) of cobaltous acetate tetrahydrate in place of the manganous salt. The product was a sticky pink solid softening at 120–150° C.

*Analysis.*—Calc'd for $C_{32}H_{58}O_6Co$: Co, 9.88%. Found: Co, 10.3%.

In general, the above procedures readily illustrate the preparations of the various acetates and acetoacetates employed herein.

EXAMPLES 10–12

Films similar to those of Examples 1, 2, and 4 were prepared in which 0.5% of a black organic dye was substituted for the 2% Sterling R. Results are shown in Table 2. Again it is apparent that the addition of the manganous photo-oxidation catalyst accelerates the photo-deterioration of the film to such an extent that it can be crumbled and plowed under the ground after exposure for one growing season.

TABLE 2

| Ex. | Film composition | Elongation after 188 hr. of exposure, percent | Exposure time (hr.) required for embrittlement |
| --- | --- | --- | --- |
| 10 | Tenite 860 | 25 | 400 |
| 11 | Tenite 860+0.5% 4-[p-bis(2-hydroxyethyl)aminophenylazo-p-phenylazo]-3-hydroxy-2-naphthoic acid (black dye). | 20 | 400 |
| 12 | Tenite 860+0.5% 4-[p-bis(2-hydroxyethyl)aminophenylazo-p-phenyleneazo]-3-hydroxy-2-naphthoic acid (black dye)+1% manganous stearate. | 0 | 180 |
| 12A | Example 12 was repeated substituting manganous dodecyl acetoacetate for the manganous stearate. | 0 | 180 |

EXAMPLES 13–18

Films similar to those of Example 3 were compounded containing 2% Sterling R, and 1% cobalt acetate, along with a third additive selected from the following classes of compounds: insect repellents, insecticides, fungicides, fertilizers, soil conditioners. The results of Table 3 show that sufficiently rapid weathering breakdown was obtained in all cases.

TABLE 3

| Example | Third additive | Exposure time (hr.) required for embrittlement |
| --- | --- | --- |
| 13 | 5% N,N-diethyl m-toluamide | 180 |
| 14 | 5% Pyrethrum | 180 |
| 15 | 5% Cupric pentachloro phenolate | 200 |
| 16 | 10% 10-20-10 fertilizer (10% nitrogen, 20% available phosphoric acid, and 10% water soluble potash) | 180 |
| 17 | 10% Potassium nitrate | 190 |
| 18 | 20% Sodium polyacrylate | 180 |

It is to be expected that many other pro-oxidants besides those mentioned above could be used in these perishable black film compositions. For example, compounds of iron, copper, chromium, vanadium, nickel, silver, and so on, could serve as the required oxidation catalyst. Also it is to be expected that perishable black mulching films of similar utility could be prepared from other poly(α-olefin) materials, such as polypropylene, poly(1-butene), poly(4-methyl pentene-1), etc., and mixtures of these hydrocarbon polymers.

The following Examples 19–22 show the effects on outdoor deterioration rate of varying the pro-oxidant concentration in the aforesaid Tenite 860 films containing 2% Sterling R and manganous stearate pro-oxidant.

TABLE 4

| Example | Pro-oxidant concentration (percent by wt.) | Time (weeks) to disintegrate outdoors |
| --- | --- | --- |
| 19 | 0.2 | 3. |
| 20 | 0.1 | 9. |
| 21 | 0.05 | 12. |
| 22 | Blank | >19 (still tough). |

Examples of useful additives and their functions are set forth in the following table:

TABLE 5

| | |
| --- | --- |
| Insect repellent | N,N-diethyl m-toluamide |
| Animal repellent | Diphenyl sulfide |
| Insecticide | Pyrethrum |
| Bactericide | Trichlorocarbanilide |
| Fungicide | Cupric pentachlorophenolate |
| Fertilizer | Ammonium nitrate |
| Mineral | Manganese sulfate |
| Soil conditioner | Sodium polyacrylate |

Examples illustrating the deterioration effect upon plastics other than polyethylene are as follows.

EXAMPLE 23

Example 21 was repeated with polypropylene film substituted for polyethylene film. The film disintegrated in three weeks, compared with eight weeks for the corresponding film containing no pro-oxidant.

EXAMPLE 24

Example 21 was repeated with film of poly(butene-1) instead of polyethylene. Disintegration time was three weeks, compared with eight weeks for the corresponding film containing no pro-oxidant.

The film thickness preferred for agricultural mulching use is 1 to 5 mils. For a given disintegration time, more pro-oxidant should be used for the thicker films and less for the thinner.

Since the higher polyolefins, like polypropylene and poly(butene-1) are more easily oxidized than polyethylene, it is advisable to use a finer particle-size carbon black or less pro-oxidant, or both, to achieved the same disintegration time for the higher polyolefin films as for the polyethylene films.

The invention has been described in detail with particular reference to preferred embodiments thereof but it will be understood that variations and modifications can be effected within the spirit and scope of the invention as described hereinabove and as defined in the appended claims.

We claim:

1. A composition comprising a polyolefin; an opaquing pigment or dye in an amount sufficient to reduce the transmission of sunlight by said polyolefin to less than about 10%; and at least one pro-oxidant selected from the group consisting of (A) acetyl acetonates of manganese, cobalt, chromium, iron, copper or vanadium, (B) alkyl acetoacetates of manganese, cobalt, chromium, iron, nickel, zinc, copper or vanadium, wherein the alkyl group has 8 to 18 carbon atoms, (C) alkyl benzoylacetates of manganese, cobalt, chromium, iron, nickel, zinc, copper or vanadium, wherein the alkyl group has 8 to 18 carbon atoms, (D) manganous or cobaltous stearates, and (E) manganous or cobaltous oleates, said pro-oxidant being present in an amount sufficient to promote oxidative deterioration of said polyolefin.

2. A composition according to claim 1 wherein said polyolefin is polyethylene or polypropylene and said pro-oxidant is present in an amount of about 0.01 to 1.5% by weight of said polyolefin.

3. A composition according to claim 2 wherein an opaquing pigment is present which comprises finely divided carbon.

4. A degradable film comprising a polyolefin; an opaquing pigment or dye in an amount sufficient to reduce the transmission of sunlight by said polyolefin to less than about 10%; and at least one pro-oxidant selected from the group consisting of (A) acetyl acetonates of manganese, cobalt, chromium, iron, copper or vanadium, (B) alkyl acetoacetates of manganese, cobalt, chromium, iron, nickel, zinc, copper or vanadium, wherein the alkyl group has 8 to 18 carbon atoms, (C) alkyl benzoylacetates of manganese, cobalt, chromium, iron, nickel, zinc, copper or vanadium, wherein the alkyl group has 8 to 18 carbon atoms; (D) manganous or cobaltous stearates, and (E) manganous or cobaltous oleates, said pro-oxidant being present in an amount sufficient to promote oxidative deterioration of said polyolefin.

5. A degradable film according to claim 4 which is about 1 to about 5 mils in thickness.

6. A degradable film according to claim 5 wherein said polyolefin is polyethylene or polypropylene and said pro-oxidant is present in an amount of about 0.01 to 1.5% by weight of said polyolefin.

7. A degradable film according to claim 6 wherein an opaquing pigment is present which comprises finely divided carbon having particle sizes in the range of about 10 m$\mu$ to about 30 m$\mu$, the concentration of said pigment being from about 0.2 to 3.0% by weight of said polyolefin.

8. A degradable film according to claim 6 wherein an opaquing dye is present which comprises 4-[p-bis(2-hydroxyethyl)aminophenylazo-p-phenyleneazo] - 3-hydroxy-2-naphthoic acid, the concentration of said dye being from about 0.05 to about 1.0% by weight of said polyolefin.

9. Polyolefin composition containing an oxidizing system consisting essentially of at least one of manganous and cobaltous stearates and oleates in a total concentration in the range of from about 0.01 to about 0.5% by weight of the polyolefin, and from about 0.35 to about 15% by weight of particulate carbon having an average particle diameter in the range of from about 10 m$\mu$ to about 300 m$\mu$.

10. The composition of claim 9 in the form of a film of from about 1 to about 5 mil thickness having a transmittance of normal sunlight of less than 1%.

References Cited

UNITED STATES PATENTS

| | | | |
| --- | --- | --- | --- |
| 3,017,376 | 1/1962 | Bafford et al. | 260—23 |
| 3,248,378 | 4/1966 | Behrenbruch et al. | 260—93.7 |

(Other references on following page)

| | | | |
|---|---|---|---|
| 3,287,342 | 11/1966 | Walton | 260—93.7 |
| 3,320,695 | 5/1967 | Moore | 47—9 |
| 3,332,926 | 7/1967 | Baron et al. | 260—93.7 |
| 3,341,357 | 9/1967 | Feild | 117—138.8 |

OTHER REFERENCES

Newland et al.: Defensive publication search copy of Serial No. 680,655, filed Nov. 6, 1967, published in 856 O.G. 5, Nov. 5, 1968, class 47–9.

HOSEA E. TAYLOR, JR., *Primary Examiner.*

R. A. WHITE, *Assistant Examiner.*

U.S. Cl. X.R.

47—9; 260—41, 94.9; 424—83